United States Patent
Liu

(10) Patent No.: US 9,826,568 B2
(45) Date of Patent: Nov. 21, 2017

(54) METHOD, SYSTEM AND COMPUTER-READABLE STORAGE MEDIUM FOR REDUCING DATA TRANSMISSION DELAY

(71) Applicant: TENCENT TECHNOLOGY (SHENZHEN) COMPANY LIMITED, Shenzhen (CN)

(72) Inventor: Shan Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 65 days.

(21) Appl. No.: 14/699,826

(22) Filed: Apr. 29, 2015

(65) Prior Publication Data

US 2015/0250015 A1 Sep. 3, 2015

Related U.S. Application Data

(63) Continuation of application No. PCT/CN2014/076653, filed on Apr. 30, 2014.

(30) Foreign Application Priority Data

Jun. 20, 2013 (CN) .......................... 2013 1 0246724

(51) Int. Cl.
*H04W 4/00* (2009.01)
*H04W 76/04* (2009.01)
(Continued)

(52) U.S. Cl.
CPC ......... *H04W 76/045* (2013.01); *H04L 67/145* (2013.01); *H04L 69/28* (2013.01)

(58) Field of Classification Search
CPC ........................ H04W 74/004; H04W 74/0833
(Continued)

(56) References Cited

U.S. PATENT DOCUMENTS

2007/0015520 A1 1/2007 Casey
2009/0036116 A1* 2/2009 Kim ...................... H04W 24/10
455/423
(Continued)

FOREIGN PATENT DOCUMENTS

CN 1838812 A 9/2006
CN 101395828 A 3/2009
(Continued)

OTHER PUBLICATIONS

International Search Report and Written Opinion of the International Searching Authority for International Application No. PCT/CN2014/076653, dated Jul. 16, 2014.
(Continued)

*Primary Examiner* — Iqbal Zaidi
(74) *Attorney, Agent, or Firm* — Seyfarth Shaw LLP

(57) ABSTRACT

A method for reducing data transmission delay is provided. The method includes: detecting whether a terminal has data sending or receiving, and determining whether a current network is idle; determining, if detecting that the terminal has no data sending or receiving, that the current network is idle, connecting and communicating with a server at a preset time interval, and maintaining the communication channel with the server. By the method, whether the network is idle is detected; when it is detected that the network is idle, connect and communicate with the server at a preset time interval, and maintain the communication channel with the server. This avoids the release of the channel due to idle network, and consequently avoids the need of re-establishing the channel when data transmission is enabled again, thereby reducing data transmission delay. Furthermore, a system for monitoring operation platform is also disclosed.

11 Claims, 6 Drawing Sheets

(51) Int. Cl.
*H04L 29/08* (2006.01)
*H04L 29/06* (2006.01)

(58) Field of Classification Search
USPC .................................................. 370/328–339
See application file for complete search history.

(56) References Cited

U.S. PATENT DOCUMENTS

| | | | |
|---|---|---|---|
| 2009/0040039 A1 | 2/2009 | Kaneko et al. | |
| 2015/0003391 A1* | 1/2015 | Chen ..................... | H04L 5/0092 370/329 |
| 2015/0071228 A1* | 3/2015 | Quan ..................... | H04W 28/02 370/329 |

FOREIGN PATENT DOCUMENTS

| | | |
|---|---|---|
| CN | 101808407 A | 8/2010 |
| CN | 102244841 A | 11/2011 |
| CN | 102695279 A | 9/2012 |
| CN | 103079285 A | 5/2013 |

OTHER PUBLICATIONS

Search Report & First Office Action for Priority Chinese Patent Application No. 201310246724.X, dated Apr. 6, 2017, 7 pages.

* cited by examiner

METHOD, SYSTEM AND COMPUTER-READABLE STORAGE MEDIUM FOR REDUCING DATA TRANSMISSION DELAY

CROSS REFERENCE TO RELATED APPLICATIONS

This application is a continuation application of the PCT International Application No. PCT/CN2014/076653, filed on Apr. 30, 2014, entitled "METHOD, SYSTEM AND COMPUTER-READABLE STORAGE MEDIUM FOR REDUCING DATA TRANSMISSION DELAY", which claims the priority from the Chinese patent application No. CN 201310246724.X, filed on Jun. 20, 2013. The above-referenced applications are hereby incorporated herein in their entireties by reference.

FIELD OF THE INVENTION

The present disclosure relates generally to the field of wireless communication, and more particularly to a method, system and computer-readable storage medium for reducing data transmission delay.

BACKGROUND OF THE INVENTION

Currently, in order to transmit data, a terminal has to establish a communication channel with a base station of the operator. There are at least the following problems existing in the prior art: if the channel, after established, has not been used by the terminal over the channel recovery time, it will be released. At this moment, although the physical connection between the terminal and the base station may remain, a new channel has to be re-established for the terminal to re-transmit data. The re-establishment of a channel has to go through a process of channel allocation and authentication, which can extend the data transmission delay.

Therefore, heretofore unaddressed needs exist in the art to address the aforementioned deficiencies and inadequacies.

SUMMARY OF THE INVENTION

In view of the above, there is a need to provide a method and system for reducing data transmission delay.

According to one aspect of the disclosure, a method for reducing data transmission delay includes: detecting whether a terminal has data sending or receiving, and determining whether a current network is idle; determining, if detecting that the terminal has no data sending or receiving, that the current network is idle, and connecting and communicating with a server at a preset time interval, and maintaining a communication channel with the server.

According to another aspect of the disclosure, a system for reducing data transmission delay includes: an idle detecting module, configured to detect whether a terminal has data sending or receiving, and to determine whether a current network is idle; a channel maintaining module, configured to determine, if the idle detection module detects that the terminal has no data sending or receiving, that the current network is idle, to connect and communicate with a server at a preset time interval, and to maintain a communication channel with the server.

According to still another aspect of the disclosure, a non-transitory computer-readable storage medium storing an executable program to execute a method for reducing data transmission delay is disclosed. The method includes the following steps: detecting whether a terminal has data sending or receiving, and determining whether a current network is idle; determining, if detecting that the terminal has no data sending or receiving, that the current network is idle, and connecting and communicating with a server at a preset time interval, and maintaining a communication channel with the server.

The above method and system for reducing data transmission delay may detect whether the network is idle. When it is detected that the network is idle, connect and communicate with the server at a preset time interval, and maintain the communication channel with the server. This avoids the release of the channel due to idle network, and consequently avoids the need of re-establishing the channel when data transmission is enabled again, reducing data transmission delay.

DETAILED DESCRIPTION OF THE PREFERRED EMBODIMENT

In the following description of embodiments, reference is made to the accompanying drawings which form a part hereof, and in which it is shown by way of illustration specific embodiments of the disclosure that can be practiced. It is to be understood that other embodiments can be used and structural changes can be made without departing from the scope of the disclosed embodiments.

Figure 1:
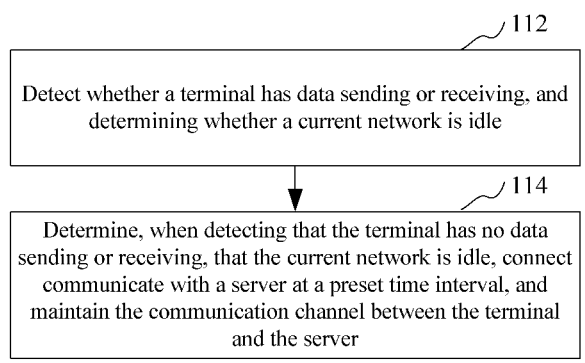
FIG. 1 is a flowchart showing a method for reducing data transmission delay in one embodiment of the present disclosure.

As shown in FIG. 1, a method for reducing data transmission delay in one embodiment of the present disclosure is provided. The method in the embodiment is illustrated as being applied to a terminal having the function of wireless communication. The terminal may include, for example, smart phones, tablet computers, portable laptop computers and desktop computers, etc. The method includes the following steps.

Step 112: detecting whether a terminal has data sending or receiving, and determining whether a current network is idle.

In the embodiment, whether a current network is idle is determined by detecting whether the terminal has data sending or receiving. This can be achieved by running in the terminal a detecting process for detecting whether the network is idle. The detecting process may monitor the behavior of data uploading and downloading of the terminal, so as to determine whether the current network is idle. Alternatively, an external means for detecting data sending and receiving can be connected via the network interface to detect whether the current network is idle.

The data sending or receiving may be detected continuously or periodically, or may be detected in different time segments with different detection strategies. For example, use different detection strategies for peak and trough of network usage. A switch can be provided to activate or turn off the function of detection of whether the network is idle. Alternatively, a threshold value can be preset. When the idle time of network exceeds this threshold, it may indicate that the user may not perform data transmission for a long time. At this time, it is possible to choose not to detect that whether the current network is idle, thus saving energy and consumption of data traffic.

The current network may be a mobile communication network (for example, any one of 2G, 3G (WCDMA, TD-SCDMA, CDMA2000), 4G (LTE) and the like) by which a terminal is connected directly to the operator station, or may be a network, including LAN, network shared by other devices, etc., by which the terminal is connected indirectly to a mobile communication network, so as to connect to the operator station.

Step 114: if it is detected that the terminal has no data sending or receiving and determined that the current network is idle, connecting and communicating with a server at a preset time interval, and maintaining the communication channel between the terminal and the server.

When detecting that the current network is idle, it indicates that the terminal has no data sending or receiving. But if the channel release time interval is exceeded, the channel will be released. Therefore, the terminal has to connect and communicate with the server in order to avoid release of the channel. Connection and communication between the terminal and the server can be realized in a way that the terminal sends a connection establishment request to the server, and the server, after receiving the request, sends feedback of connection establishment to the terminal; then, the terminal receives the feedback from the server. At this time, connection and communication between the terminal and the server is completed. To improve security, the server may also authenticate the connection establishment request from the terminal before sending the feedback of connection establishment to the terminal.

In one embodiment, the preset time interval may be set as a fixed value. For example, in a 3G network, the preset time interval is 6 seconds; thus, the terminal will connect and communicate with the server every 6 seconds. Meanwhile, the channel release time interval in a 3G network is greater than 6 seconds. As a result, it is ensured that the channel will not be released, thereby reducing the data transmission delay.

In the embodiment, whether the network is idle is detected. When it is detected that the network is idle, connect and communicate with the server at a preset time interval, and maintain the communication channel with the server. This avoids the release of the channel due to idle network, and consequently avoids the need of re-establishing the channel when data transmission is enabled again, reducing data transmission delay.

The preset time interval can be less than the channel release time interval when the network is idle, or can be greater than latter. When the preset time interval is less than the channel release time when the network is idle, the communication channel can be always maintained; when the preset time interval is greater than the channel release time when the network is idle, the communication channel may be released. However, when the preset time interval is reached, it may restore to maintain the communication channel to some extent. In the embodiment, the preset time interval is less than the channel release time interval when the network is idle. The preset time interval can be obtained by any of the following ways.

First, obtain preset time interval of the current network from a service platform via the network.

A service platform, which may be a server, can be set to provide terminals connected to the platform with the preset time interval of the current network. The same terminals may require different preset time intervals due to different network information, including different network operators, attributions and standards. The service platform can set in the database different preset time intervals based on network information of operator, attribution, and standard, etc. When connected to the service platform, the terminal can provide the network information to the service platform, which can then find the corresponding preset time intervals in the database based on the information, and provide to the terminal.

Second, select the corresponding preset time interval from the local according to the network information.

The preset time interval can also be stored in a local file, such as a text file, database or other file formats. By reading the local file, the terminal may obtain the preset time interval, which can be stored in the local file corresponding to the network information. It is possible to obtain the preset time interval corresponding to the network information from the local file by detecting network information of operator, attribution and standard. The local file may be compiled by the user, or may be downloaded from the network. For example, the terminal may download from the service platform a data file with the preset time interval stored corresponding to the network information, and then read the preset time interval from the local data file.

Third, obtain the preset time interval by performing connection test with the server when the current network is idle.

When the current network is idle, it is possible to obtain the preset time interval by the terminal by connection test with the server. When the preset time interval is less than the channel release time interval when the network is idle, connecting and communicating with the server according to preset time interval can avoid the release of the channel and reduce the data transmission delay.

In one embodiment, in the step of obtaining the preset time interval by performing connection test with the server when the current network is idle, the deviation of the preset time interval and the release time interval is within a preset range. The closer the preset time interval to the release time interval, the more times of connection and communication with the server at the same time and the less power consumption will be. Due to measurement error, network condition and test accuracy, the preset time interval obtained by test may have deviation with the release time interval. When the deviation is within the preset range, it is ensured that the channel will not be released, and the energy consumption is low and effective. The deviation of the preset time interval and the release time interval can take many forms, such as a difference. For example, for a preset range of [−0.5 seconds, 0), when the difference between the preset time interval and the release time interval is within [−0.5 seconds, 0), the preset time interval obtained by connection test is valid. Alternatively, the deviation may be a ratio. For example, for a preset range of [−10% 0), when the ratio of the difference between the preset time interval and the release time interval to the release time interval is within [−10%, 0), the preset time interval is valid.

In the embodiment, the preset time interval can be obtained by a variety of ways. Thus, the preset time interval obtained can be more reasonable, which ensures the channel as not being released and reduces data transmission delay, thereby reducing energy consumption.

Figure 2:
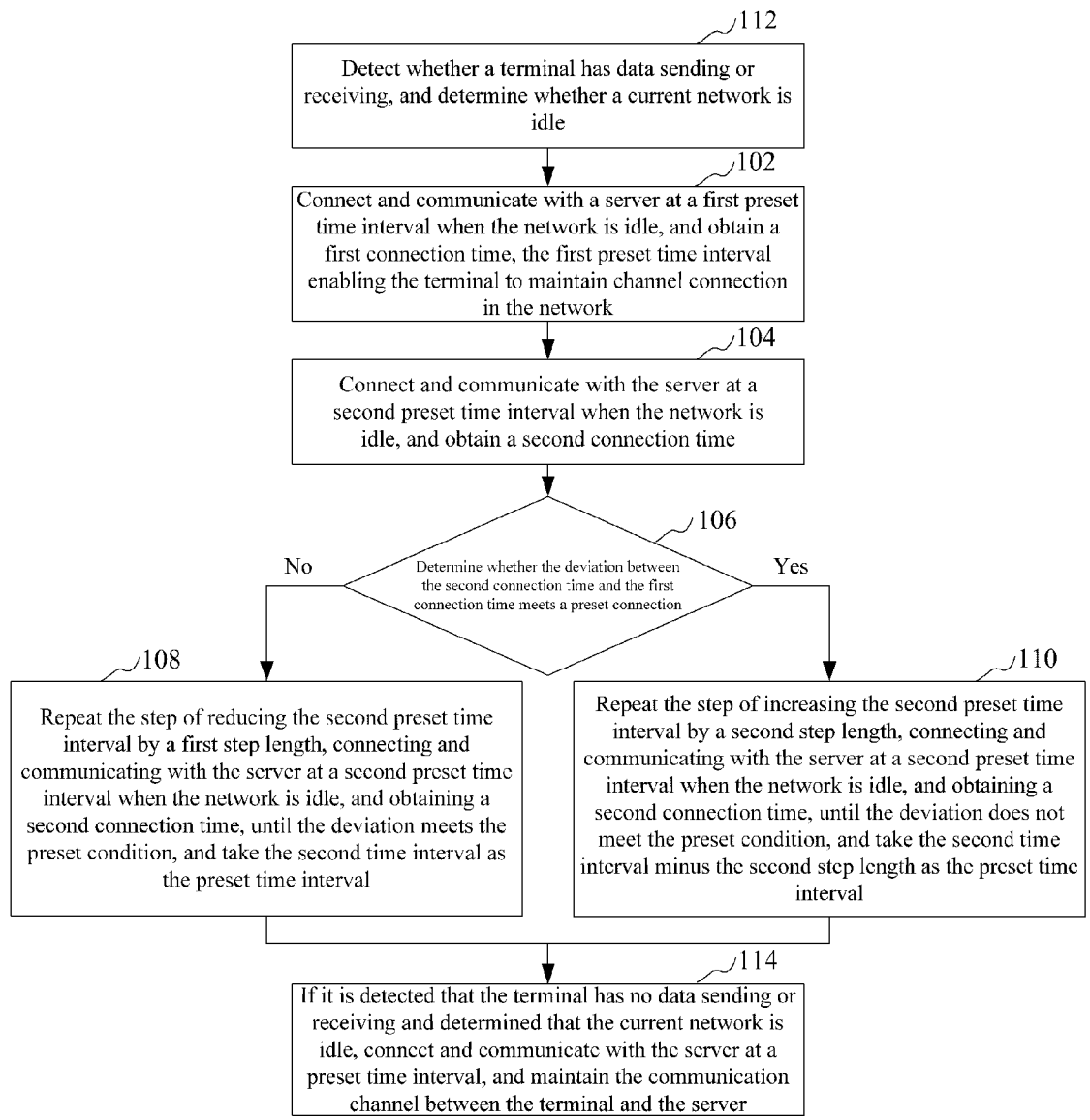
FIG. 2 is a flowchart showing a method for reducing data transmission delay in a specific embodiment of the present disclosure.

As shown in FIG. 2, in a specific embodiment, the method further include the step of obtaining a preset time interval by performing connection test with the server when the current network is idle, the step further including:

Step 102: connecting and communicating with a server at a first preset time interval when the network is idle, and obtaining a first connection time, the first preset time interval enabling the terminal to maintain channel connection in the network.

The first preset time interval is less than a common channel release time interval of a network, i.e., the first preset time interval is a time interval that enables a terminal to maintain the channel connection in a common network. The first preset time interval may be a fixed value, which, in the 2G or 3G networks, are able to maintain connection of the communication channel. A first connection time obtained by connecting and communicating with the server at a first preset time interval when the network is idle can be a reference value of connection time. If the connection time obtained by using the tested preset time interval is the same or close to the first connection time, it indicates that the tested preset time interval can maintain connection of a communication channel.

In one embodiment, connecting and communicating with the server, and obtaining a first connection time includes: connecting and communicating with the server at a first preset time interval when the network is idle, recording the connection time of each time connecting and communicating with the server, and calculating the average time of preset numbers of connection time as the first connection time. In the embodiment, by calculating the average time of preset numbers of connection time as the first connection time, the affect of errors is reduced. As a result, the preset time interval obtained by test can be more reliable, thereby achieving the beneficial effects of maintaining the connection of communication channel and reducing data transmission delay.

Step 104, connecting and communicating with the server at a second preset time interval when the network is idle, and obtaining a second connection time.

The second preset time interval can be a fixed value, such as 15 seconds, 10 seconds, etc., which can be greater or smaller than the channel release time. Typically, it may be the average value of release time interval of common networks.

In one embodiment, connecting and communicating with the server and obtaining a second connection time includes: connecting and communicating with the server at a second preset time interval when the network is idle, recording the connection time of each time connecting and communicating with the server, and calculating the average time of preset numbers of connection time as the second connection time. In the embodiment, by calculating the average time of preset numbers of connection time as the second connection time, the affect of errors is reduced. As a result, the preset time interval obtained by test can be more reliable, thereby achieving the beneficial effects of maintaining the connection of communication channel and reducing data transmission delay.

In one embodiment, the first preset time interval and/or the second preset time interval can be obtained by: obtaining the first preset time interval and/or the second preset time interval of the current network from the service platform via the network. The first preset time interval and/or the second preset time interval can be pre-stored in the service platform, and classified based on the network information. The terminal can obtain, according to the network information of the current network, corresponding first preset time interval and/or second preset time interval. The network information may include operator information, network standard and network attribution.

In one embodiment, the first preset time interval and/or the second preset time interval can be obtained by: selecting the corresponding first preset time interval and/or second preset time interval from the local according to the network information. The first preset time interval and/or the second preset time interval can be stored corresponding to the network information. By detecting the network information of the network used by the user including network operator, attribution and standard, it is possible to obtain the preset time interval corresponding to the network information from the local file. The local file may be compiled by the user, or may be downloaded from the network.

Step 106, determining whether the deviation between the second connection time and the first connection time meets a preset connection.

The deviation between the second and the first connection time can be the difference of the second and the first connection time, or can be the ratio of the difference of the second and the first connection time to the first connection time, or the ratio of the difference of the second and the first connection time to the second connection time. The preset condition can be that the ratio of the difference of the second and the first connection time to the first connection time is greater than a preset ratio threshold, e.g. the preset ratio threshold may be 10%.

Step 108: when the deviation does not meet the preset condition, repeating the step of reducing the second preset time interval by a first step length, connecting and communicating with the server at a second preset time interval when the network is idle, and obtaining a second connection time, until the deviation meets the preset condition, and taking the second time interval as the preset time interval.

The first connection time is a reference value of connection time for maintaining connection of the communication channel. When the deviation between the second and the first connection time does not meet the preset condition, it indicates that the present second preset time interval, which is greater than the channel release time, cannot maintain connection of the communication channel. Therefore, the second preset time interval should be reduced by a first step length and tested again. When the deviation between the second and the first connection time meets the preset condition, it indicates that the present second preset time interval is smaller than the channel release time, and can be taken as the preset second preset time.

The first step length can be preset as needed. For example, when setting the first step length as 2 seconds, a preset time interval for maintain the connection of communication channel with the server can be found quickly by performing connection test with the server. When setting the first step length as 0.2 second, it may take more time to perform the connection test. But when the preset time interval is closer to the release time interval, it is possible reduce the number of times of connecting and communicating with the server in order to maintain the communication channel when the network is idle, thereby reducing energy consumption.

Step 110: when the deviation meets the preset condition, repeating the step of increasing the second preset time interval by a second step length, connecting and communicating with the server at a second preset time interval when the network is idle, and obtaining a second connection time, until the deviation does not meet the preset condition, and taking the second time interval minus the second step length as the preset time interval.

When the deviation between the second and the first connection time meets the preset condition, it indicates that the second preset time interval, which is able to maintain the connection of communication channel, can be taken as the preset time interval. To find a preset time interval closer to the release time interval, the second preset step length can be used to increase the value of the second preset time interval. Then, test again until the deviation does not meet the preset condition. At this time, it may indicate that the second preset time interval is greater than the release time interval, and is no longer capable of maintaining the connection of communication channel. Thus, the previous second preset time interval corresponding to the second connection time interval obtained when meeting the preset condition can be taken as the preset time interval, e.g., taking the present preset time interval minus the second step length as the preset time interval.

In one embodiment, the preset time interval and its corresponding network information can be uploaded to the service platform. In the embodiment, after uploading of the preset time interval and its corresponding network information, the service platform can classify the preset time intervals uploaded by the terminal according to the corresponding network information, and the other terminals can obtain the preset time interval according to the corresponding network information without connecting with the server to perform connection test.

In the embodiment, by determining whether the deviation between the second and the first connection time meets the preset condition, it is possible to reduce the second time interval when the deviation does not meet the preset condition, and increase the time interval when the deviation meets the preset condition. During the constant adjustment of the second time interval, the value of the second time interval is gradually getting closer to the release time interval, such that a preferable second preset time interval can be found and taken as the preset time interval. By connecting and communicating with the server using this preset time interval, it is possible to maintain the connection of communication channel of the terminal, reducing data transmission delay increased by network idle. Meanwhile, the number of times of connecting and communicating with the server is also reduced, thereby reducing energy consumption.

Figure 3:
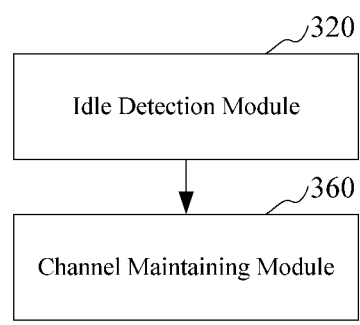
FIG. 3 is a structural block diagram showing a system for reducing data transmission delay in one embodiment of the present disclosure.

As shown in FIG. 3, in one embodiment, a system for reducing data transmission delay includes an idle detection module 320 and a channel maintaining module 360.

The idle detection module 320 is configured to detect whether a terminal has data sending or receiving, and to determine whether a current network is idle. The idle detection module 320 may be built in the terminal to detect data sending and receiving behavior of the network interface of the terminal, so as to determine whether the current network is idle. Alternatively, an external module for detecting data sending and receiving can be added via the network interface of the terminal to detect whether the current network is idle.

The data sending or receiving may be detected by the idle detection module 320 continuously or periodically, or may be detected in different time segments with different detection strategies. A switch can be provided to activate or turn off the function of detection of whether the network is idle. Alternatively, a threshold value can be preset. When the idle time of network exceeds this threshold, it may indicate that the user may not perform data transmission for a long time. At this time, it is possible to choose not to detect that whether the current network is idle, thus saving energy and consumption of data traffic.

The current network may be a mobile communication network by which a terminal is connected directly to the operator station, or may be a network, including LAN, network shared by other devices, etc., by which the terminal is connected indirectly to a mobile communication network, so as to connect to the operator station.

A channel maintaining module 360, configured to, when the idle detection module 320 detects that the terminal has no data sending or receiving and determines that the current network is idle, communicate with a server at a preset time interval, and maintain the communication channel between the terminal and the server.

When the idle detection module 320 detects that the current network is idle, it indicates that the terminal has no data sending or receiving. But if the channel release time interval is exceeded, the channel will be released. Therefore, the channel maintaining module 360 has to communicate with the server in order to avoid release of the channel. Communication between the channel maintaining module 360 and the server can be realized in a way that the channel maintaining module 360 sends a connection establishment request to the server, and the server, after receiving the request, sends feedback of connection establishment to the channel maintaining module 360; then, the channel maintaining module 360 receives the feedback from the server. At this time, communication between the channel maintaining module 360 and the server is completed. To improve security, the server may also authenticate the connection establishment request sent from the channel maintaining module 360 before sending the feedback of connection establishment to the channel maintaining module 360. In one embodiment, the preset time interval may be set as a fixed value.

In the embodiment, whether the network is idle is detected by the idle detection module 320. When the idle time of network is detected, the channel maintaining module 360 communicates with the server at a preset time interval, maintaining the communication channel with the server. This avoids the release of the channel due to idle network, and consequently avoids the need of re-establishing the channel when data transmission is enabled again, reducing data transmission delay.

The preset time interval can be less than the channel release time interval when the network is idle, or can be greater than latter. In the embodiment, the preset time interval is less than the channel release time interval when the network is idle.

Figure 4:
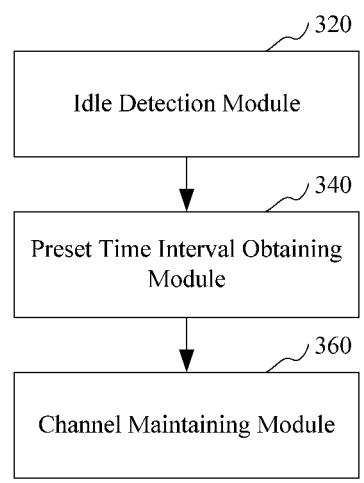
FIG. 4 is a structural block diagram showing a system for reducing data transmission delay in another embodiment of the present disclosure.

As shown in FIG. 4, in one embodiment, the system for reducing data transmission delay further includes a preset time interval obtaining module 340. The preset time interval obtaining module 340 is configured to:

First, obtain preset time interval of the current network from a service platform via the network.

The preset time interval obtaining module 340 can be connected to a service platform, which may be a server, and obtain preset time interval from the service platform. Based on the network information of the current network, the preset time interval obtaining module 340 can obtain a preset time interval correspond to the network information from the service platform. The network information may include network operators, attributions and standards.

Second, select the corresponding preset time interval according to the network information.

The preset time interval obtaining module 340 can read the local file, which may be text file, database or other file formats, to obtain the preset time interval. The preset time interval in the file can be stored corresponding to the network information, and the preset time interval obtaining module 340 can read the local file to obtain the preset time interval according to the network information of the current network. The file can be stored locally after obtained from the network.

Third, obtain the preset time interval by performing connection test with the server when the current network is idle.

When the current network is idle, it is possible to obtain the preset time interval by performing connection test with the server. When the preset time interval is less than the channel release time interval when the network is idle, connecting and communicating with the server according to preset time interval can avoid the release of the channel and reduce the data transmission delay.

In one embodiment, the deviation of the preset time interval and the release time interval is within a preset range. The preset time interval obtained by test by the preset time interval obtaining module 340 may have deviation with the release time interval. When the deviation is within the preset range, it is ensured that the channel will not be released, and the energy consumption is low and effective. The deviation of the preset time interval and the release time interval can take many forms, such as a difference of the preset time interval and the release time interval; or can be a ratio, e.g. the ratio of the difference between the preset time interval and the release time interval to the release time interval.

In another specific embodiment, the preset time interval obtaining module 340 is further configured to:

First, connect and communicate with the server at a first preset time interval when the network is idle, and obtain a first connection time, the first preset time interval enabling the terminal to maintain channel connection in the network.

The first preset time interval is less than a common channel release time interval of a network, i.e., the first preset time interval is a time interval that enables the preset time interval obtaining module 340 to maintain the channel connection in a common network. The first preset time interval may be a fixed value, which, in the 2G or 3G networks, are able to maintain connection of the communication channel. A first connection time obtained by connecting and communicating with the server at a first preset time interval when the network is idle can be a reference value of connection time. If the connection time obtained by using the tested preset time interval is the same or close to the first connection time, it indicates that the tested preset time interval can maintain connection of a communication channel.

In one embodiment, the preset time interval obtaining module 340 is further configured to connect and communicate with the server at a first preset time interval when the network is idle, to record the connection time of each time connecting and communicating with the server, and to calculate the average time of preset numbers of connection time as the first connection time. In the embodiment, by calculating the average time of preset numbers of connection time as the first connection time, the affect of errors is reduced. As a result, the preset time interval obtained by test can be more reliable, thereby achieving the beneficial effects of maintaining the connection of communication channel and reducing data transmission delay.

Second, connect and communicate with the server at a second preset time interval when the network is idle, and obtain a second connection time.

The second preset time interval can be a fixed value, which can be greater or smaller than the channel release time. Typically, it may be the average value of release time interval of common networks.

In one embodiment, the preset time interval obtaining module 340 is further configured to connect and communicate with the server at a second preset time interval when the network is idle, to record the connection time of each time connecting and communicating with the server, and to calculate the average time of preset numbers of connection time as the second connection time. In the embodiment, by calculating the average time of preset numbers of connection time as the second connection time, the affect of errors is reduced. As a result, the preset time interval obtained by test can be more reliable, thereby achieving the beneficial effects of maintaining the connection of communication channel and reducing data transmission delay.

In one embodiment, the preset time interval obtaining module 340 is further configured to obtain the first preset time interval and/or the second preset time interval of the current network from the service platform via the network. The preset time interval obtaining module 340 can obtain, according to the network information of the current network, corresponding first preset time interval and/or second preset time interval. The network information may include operator information, network standard and network attribution.

In one embodiment, the preset time interval obtaining module 340 is further configured to select the corresponding first preset time interval and/or second preset time interval from the local according to the network information. By detecting by the preset time interval obtaining module 340 the network information of the network used by the user including network operator, attribution and standard, it is possible to obtain the preset time interval corresponding to the network information from the local file. The local file may be compiled by the user, or may be downloaded from the network.

Third, determine whether the deviation between the second connection time and the first connection time meets a preset connection.

The deviation between the second and the first connection time can be the difference of the second and the first connection time, or can be the ratio of the difference of the second and the first connection time to the first connection time, or the ratio of the difference of the second and the first connection time to the second connection time. The preset condition can be that the deviation is greater than a preset ratio threshold.

Fourth, when the deviation does not meet the preset condition, the preset time interval obtaining module 340 may repeat the step of reducing the second preset time interval by a first step length, connecting and communicating with the server at a second preset time interval when the network is idle, and obtaining a second connection time, until the deviation meets the preset condition, and take the second time interval as the preset time interval.

The first connection time is a reference value of connection time for maintaining connection of the communication channel. When the deviation between the second and the first connection time does not meet the preset condition, it indicates that the present second preset time interval cannot maintain connection of the communication channel. Therefore, the second preset time interval should be reduced by a first step length and tested again. When the deviation between the second and the first connection time meets the preset condition, it indicates that the present second preset time interval is smaller than the channel release time, and can be taken as the preset second preset time.

The first step length can be preset as needed. When setting the first step length as a larger value, a preset time interval for maintain the connection of communication channel with the server can be found quickly by performing connection test with the server. When setting the first step length as a smaller value, it is possible to obtain a preset time interval closer to the release time interval, and to reduce the number of times of connecting and communicating with the server in order to maintain the communication channel when the network is idle, thereby reducing energy consumption.

Fifth, when the deviation meets the preset condition, repeat the step of increasing the second preset time interval by a second step length, connecting and communicating with the server at a second preset time interval when the network is idle, and obtaining a second connection time, until the deviation does not meet the preset condition, and take the second time interval minus the second step length as the preset time interval.

When the deviation between the second and the first connection time meets the preset condition, it indicates that the second preset time interval, which is able to maintain the connection of communication channel, can be taken as the preset time interval. To find a preset time interval closer to the release time interval, the preset time interval obtaining module 340 may use the second preset step length to increase the value of the second preset time interval. Then, test again until the deviation does not meet the preset condition. At this time, it may indicate that the second preset time interval is greater than the release time interval, and is no longer capable of maintaining the connection of communication channel. Thus, the previous second preset time interval corresponding to the second connection time obtained when meeting the preset condition can be taken as the preset time interval, e.g., taking the present preset time interval minus the second step length as the preset time interval.

Figure 5:
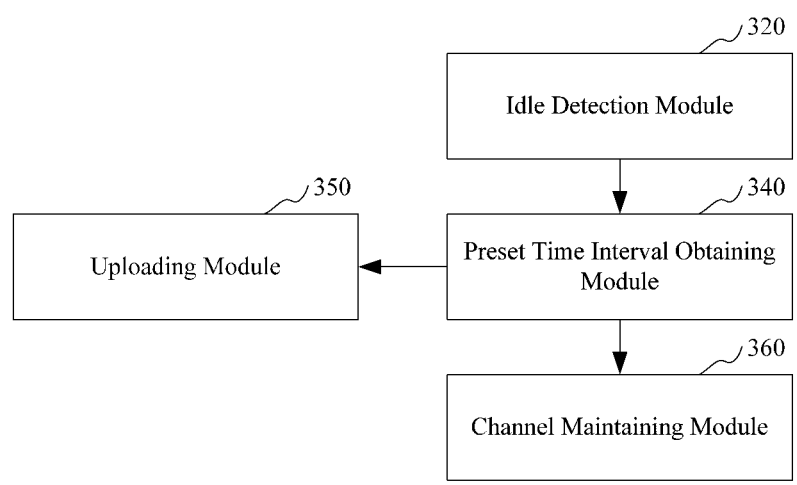
FIG. 5 is a structural block diagram showing a system for reducing data transmission delay in yet another embodiment of the present disclosure.

As shown in FIG. 5, in one embodiment, the system further includes an uploading module 350, configured to upload the preset time interval and its corresponding network information to the service platform. In the embodiment, after uploading of the preset time interval and its corresponding network information by the uploading module 350, the service platform can classify the preset time intervals uploaded by the terminal according to the corresponding network information, and the preset time interval obtaining module 340 can obtain the preset time interval according to the corresponding network information without connecting with the server to perform connection test.

In the embodiment, the system can determine by the preset time interval obtaining module 340 whether the deviation between the second and the first connection time meets the preset condition, reduce the second time interval when the deviation does not meet the preset condition, and increase the time interval when the deviation meets the preset condition. During the constant adjustment of the second time interval, the value of the second time interval is gradually getting closer to the release time interval, such that a preferable second preset time interval can be found and taken as the preset time interval. By connecting and communicating with the server by the channel maintaining module 360, it is possible to maintain the connection of communication channel of the terminal, reducing data transmission delay increased by network idle. Meanwhile, the number of times of connecting and communicating with the server is also reduced, thereby reducing energy consumption.

It should be noted that for a person skilled in the art, partial or full process to realize the methods in the above embodiments can be accomplished by related hardware instructed by a computer program, the program can be stored in a computer readable storage medium and the program can include the process of the embodiments of the above methods. Wherein, the storage medium can be a disk, a light disk, a Read-Only Memory or a Random Access Memory, etc.

Figure 6:
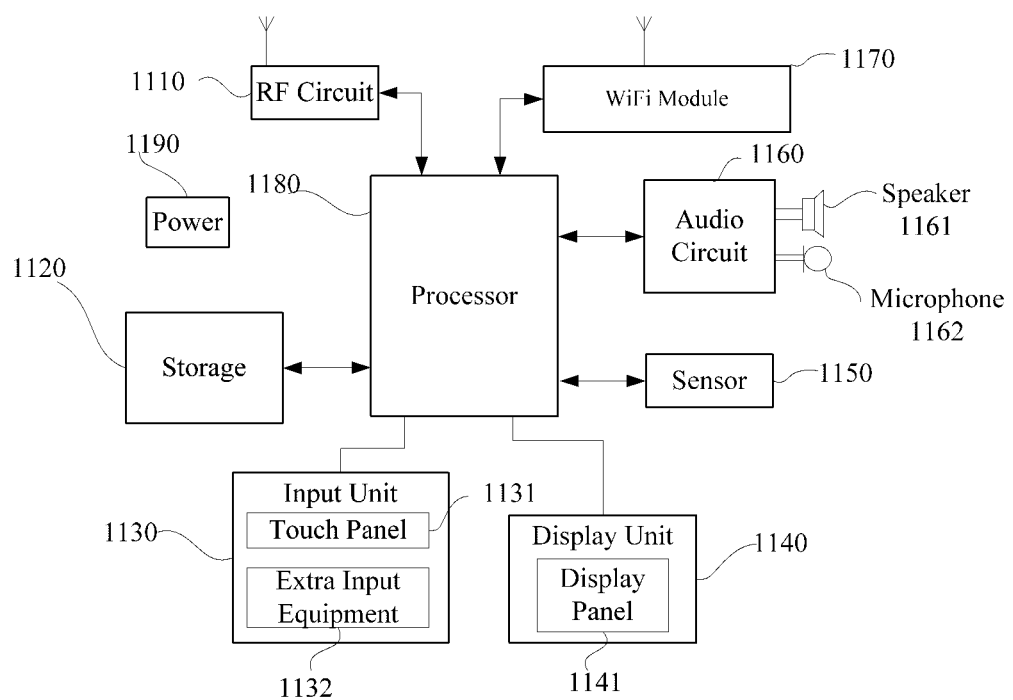
FIG. 6 is a structural schematic diagram showing a terminal for reducing data transmission delay in another embodiment of the present disclosure.

The embodiments herein also disclose a terminal for reducing data transmission delay, as show in FIG. 6. For the convenience of illustration, FIG. 6 only shows a partial structure that is relevant to the embodiments, while specific technical details not shown may be found in the methods described in the embodiments. The terminal may comprise any terminal device such as a mobile phone, a tablet computer, a PDA (Personal Digital Assistant), a POS (Point of Sales), an onboard computer, etc. A mobile phone is described as an example herein.

FIG. 6 shows a block diagram of a partial structure of a mobile phone corresponding to the terminal in one embodiment. Referring to FIG. 6, the mobile phone includes: a RF (Radio Frequency) circuit 1110, storage 1120, an input unit 1130, a display unit 1140, a sensor 1150, an audio circuit 1160, a wireless fidelity (WiFi) module 1170, a processor 1180, and a power source 1190, etc. It is understandable to a person skilled in the art that the structure of mobile phone is not limited by, but may instead include more or less components than, the components shown in FIG. 6, or it may comprise a certain combination of the aforementioned components or have a different component configuration.

Each structural component of the mobile phone will be discussed in details below in reference to FIG. 6.

The RF circuit 1110 may send and receive signals during a message conversation or phone call. Specifically, it may receive downward messages from the base station and send them to the processor 1180 for processing; meanwhile, it may also send upward messages to the base station. Usually, the RF circuit includes, but not limited to, an antenna, at least one amplifier, a transceiver, a coupler, a LNA (Low Noise Amplifier), a duplexer, and so on. Furthermore, the RF circuit 1110 may also communicate with the internet and other devices wirelessly. Such wireless communication may adopt any communication standard or protocol, including, but not limited to, GSM (Global System of Mobile communication), GPRS (General Packet Radio Service), CDMA (Code Division Multiple Access), WCDMA (Wideband Code Division Multiple Access), LTE (Long Term Evolution), E-Mail, SMS (Short Messaging Service), and so on.

The storage 1120 may store software programs and modules, which may be run by the processor 1180 to execute various functional applications and process data in the mobile phone. The storage 1120 may mainly include a program storage area and a data storage area. The program storage area may store the operation system, application programs required by at least one function (such as voice playing function, image displaying function, etc.), and so on. The data storage area may store data created by mobile phone usage (such as voice data, contacts, etc.), and so on. The storage 1120 may further include a high-speed random-access memory storage and also a nonvolatile storage, e.g., at least one disk storage device, flash memory device, or any other nonvolatile solid state storage device.

The input unit 1130 may receive input of number or character information, and generate input of key signal associated with user setting and function control of the mobile phone. Specifically, the input unit 1130 may comprise a touch panel 1131 and an extra input device 1132. The touch panel 1131, also called a touch screen, may collect touch operation by the user on or near the touch panel (e.g., operation on or near the touch panel 1131 with fingers, a touch pen, or any other suitable object or accessory, conducted by the user), and actuate a corresponding connection device according to a pre-set program. Optionally, the touch panel 1131 may include two portions: a touch detection device and a touch controller. The touch detection device may detect the touch position of the user and the signal caused by the touch operation, and send the signal to the touch controller. The touch controller may receive the touch information from the touch detection device, convert it to contact coordinates, and sends the coordinates to the processor 1180. The touch control device also receives controls from the processor 1180 to execute. Alternatively, the touch panel 1131 may be configured in many types, such as resistance-type, capacitance, infrared, SAW (surface acoustic wave), and so on. In addition to the touch panel 1131, the input unit 1130 may also include an extra input device 1132. Specifically, the extra input device 1132 may be any one of the following including but not limited to: a physical keyboard, function keys (such as volume control keys, switch buttons, etc.), a trackball, a mouse, a joystick, and so on.

The display unit 1140 may display information received from or provided to the user as well as display various mobile phone menus. The display unit 1140 may include a display panel 1141. The display panel 1141 may be configured with a LCD (Liquid Crystal Display), or alternatively, an OLED (Organic Light-Emitting Diode). Furthermore, a touch panel 1131 may cover the display panel 1141. A touch operation, when detected on or near the touch panel 1131, is sent to the processor 1180, which decides the type of the touch event and accordingly provides corresponding visual output on the display panel 1141. Although in FIG. 6, the touch panel 1131 and the display panel 1141 carry out the input and output functions of the mobile phone as two independent components, but they may also be integrated to realize the input and output functions in some embodiments.

The mobile phone may further include at least one sensor 1150, such as an optical sensor, a motion sensor, or any other sensor. Specifically, an optical sensor may include an ambient light sensor and a proximity sensor. The ambient light sensor may regulate the brightness of the display panel 1141 according to the intensity of ambient light, while the proximity sensor may turn off the display panel 1141 and/or the backlight when the mobile phone moves close to the ear. As one type of the motion sensors, an accelerometer sensor may detect the acceleration in every direction (usually triaxially) or the magnitude and direction of gravity when the mobile phone is still. It may be used in applications that requires posture detection of the mobile phone (such as switching between vertical and horizontal position, games related to such switching, and posture calibration of magnetometer), functions associated with vibration detection (such as a pedometer and knocking), and so on. The mobile phone may further configured with other sensors, such as a gyroscope, a barometer, a hygrometer, a thermometer, and an infrared sensor, which will not be discussed in details here.

The audio circuit 1160, speaker 1161, and microphone 1162 may provide an audio interface between the user and the mobile phone. The voice-frequency circuit 1160 may transmit the electric signals, transformed from voice data received, to the speaker 1161, where the electric signals are converted to voice signal output. On the other hand, the microphone 1162 transforms voice signals collected to electric signals, which are received by the audio circuit 1160 and converted to voice data. The voice data may be transmitted to the processor 1180, processed, and sent to, e.g., another mobile phone, by the RF circuit 1110. Alternatively, the voice data may be sent to the storage 1120 before further processing.

WiFi is a short-distance wireless communication technology. A user can use the mobile phone to receive and send emails, browse webpage, visit streaming media, etc, via the wireless communication module 1170. However, though the wireless communication module 1170 is shown in FIG. 6, it is understandable that it is not a required component of the mobile phone and may be omitted, if necessary, without changing the essential scope of the application.

The processor 1180 is the control center of the mobile phone, connected to every component of the entire mobile phone by various ports and lines, By running or executing the software programs and/or modules stored in the storage 1120 and calling the data stored in the storage 1120, the processor 1180 executes various functions of the mobile phone and processes data in order to realize overall supervision and control of the mobile phone. Alternatively, the processor 1180 may include one or more processing units. Preferably, the processor 1180 may integrate an application processor and a modem processor. The application processor may act mainly in charge of the operation systems, user interface, and application programs, while the modem processor may act mainly in charge of wireless communication. It is understandable, though, that it is not required that the aforementioned modem processor must be integrated into the processor 1180.

The mobile phone further comprises a power supply 1190 (e.g., battery) to supply power to every mobile phone component. Preferably, the power source may have a logical connection with the processor 1180 through the power management system, so that the power management system may manage the functions of charging, discharging, power dissipation management, and so on.

The mobile phone 1100 may further include a camera, a Bluetooth module, etc, though not shown. Such details will not be discussed in details herein.

According to various embodiments of the disclosure, the processor 1180 included in the terminal may further have the following function: detecting whether a terminal has data sending or receiving, and determining whether a current network is idle; determining, if detecting that the terminal has no data sending or receiving, that the current network is idle; communicating with a server at a preset time interval, and maintaining the communication channel between the terminal and the server.

In one embodiment, the preset time interval is less than the channel release time interval when the network is idle. The preset time interval can be obtained by any of the following ways: obtaining preset time interval of the current network from a service platform via the network; selecting the corresponding preset time interval from the local according to the network information; obtaining the preset time interval by performing connection test with the server when the current network is idle.

In one embodiment, the deviation of the preset time interval and the release time interval is within a preset range.

According to various embodiments of the disclosure, the processor 1180 may further have the following function: connecting and communicating with the server at a first preset time interval when the network is idle, and obtaining a first connection time, the first preset time interval enabling the terminal to maintain channel connection in the network; connecting and communicating with the server at a second preset time interval when the network is idle, and obtaining a second connection time; determining whether the deviation between the second connection time and the first connection time meets a preset connection; when the deviation does not meet the preset condition, repeating the step of reducing the second preset time interval by a first step length, connecting and communicating with the server at a second preset time interval when the network is idle, and obtaining a second connection time, until the deviation meets the preset condition, and taking the second time interval as the preset time interval; when the deviation meets the preset condition, repeating the step of increasing the second preset time interval by a second step length, connecting and communicating with the server at a second preset time interval when the network is idle, and obtaining a second connection time, until the deviation does not meet the preset condition, and taking the second time interval minus the second step length as the preset time interval.

According to various embodiments of the disclosure, the processor 1180 may further have the following function: connecting and communicating with the server at a first preset time interval when the network is idle, recording the connection time of each time connecting and communicating with the server, and calculating the average time of preset numbers of connection time as the first connection time; connecting and communicating with the server at a second preset time interval when the network is idle, recording the connection time of each time connecting and communicating with the server, and calculating the average time of preset numbers of connection time as the second connection time.

In one embodiment, the first preset time interval and/or the second preset time interval can be obtained by: obtaining the first preset time interval and/or the second preset time interval of the current network from the service platform via the network; or selecting the corresponding first preset time interval and/or second preset time interval from the local according to the network information.

According to various embodiments of the disclosure, the processor 1180 may further have the following function: uploading the preset time interval and its corresponding network information to the service platform.

The embodiments are chosen and described in order to explain the principles of the disclosure and their practical application so as to allow others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for reducing data transmission delay, comprising:

detecting whether a terminal has data sending or receiving, and determining whether a current network is idle;

determining, when detecting that the terminal has no data sending or receiving, that the current network is idle, and connecting with a server periodically according to a determined preset time interval, such that a communication channel is maintained with the server while the current network is idle, wherein the preset time interval is determined, based on one or more connections with the server, to be within a threshold of a channel release time associated with the current network and includes:

obtaining information identifying a first preset time interval that enables communication channels to be maintained with one or more other networks; and modifying, until the first preset time interval is within the threshold of the channel release time, the first preset time interval based on periodic connections with the server when the current network is idle, and wherein the preset time interval is based on performing one or more connection tests with the server when the current network is idle, such that a deviation of the determined preset time interval and the channel release time is within the threshold, and wherein information indicating the channel release time is determined based on the connection tests.

2. The method of claim 1, wherein the step of determining the preset time interval further includes:

connecting and communicating with the server at the first preset time interval when the network is idle, and obtaining a first connection time, the first preset time interval enabling the terminal to maintain channel connection in the network;

connecting and communicating with the server at a second preset time interval when the network is idle, and obtaining a second connection time;

determining whether the deviation between the second connection time and the first connection time meets a preset connection; and when the deviation does not meet the preset condition, repeating the step of reducing the second preset time interval by a first step length, connecting and communicating with the server at the second preset time interval when the network is idle, and obtaining the second connection time, until the deviation meets the preset condition, and taking the second time interval as the preset time interval; or when the deviation meets the preset condition, repeating the step of increasing the second preset time interval by a second step length, connecting and communicating with the server at the second preset time interval when the network is idle, and obtaining the second connection time, until the deviation does not meet the preset condition, and taking the second time interval minus the second step length as the preset time interval.

3. The method of claim 2, wherein the connecting and communicating with the server at the first preset time interval when the network is idle and obtaining the first connection time comprises:

connecting and communicating with the server at the first preset time interval when the network is idle, recording the connection time of each time connecting and communicating with the server, and calculating the average time of preset numbers of connection time as the first connection time;

the connecting and communicating with the server at the second preset time interval when the network is idle and obtaining the second connection time comprises:

connecting and communicating with the server at the second preset time interval when the network is idle, recording the connection time of each time connecting and communicating with the server, and calculating the average time of preset numbers of connection time as the second connection time.

4. The method of claim 2, wherein the first preset time interval and/or the second preset time interval is/are obtained by any of the following ways:
obtaining a preset time interval of the current network from a service platform via the network; or
selecting the corresponding preset time interval from the local according to the network information.

5. The method of claim 2, further comprising: uploading the preset time interval and the corresponding network information to the service platform.

6. A system for reducing data transmission delay, the system includes a processor and a computer storage medium storing instructions that when executed by the processor cause the processor to perform operations comprising:
detecting whether a terminal has data sending or receiving, and determining whether a current network is idle;
determining, when the idle detection module detects that the terminal has no data sending or receiving, that the current network is idle; and
connecting with a server periodically according to a determined preset time interval, such that a communication channel is maintained with the server while the current network is idle, wherein the preset time is determined, based on one or more connections with the server, to be within a threshold of a channel release time associated with the current network,
wherein the step of determining the preset time interval includes:
obtaining information identifying a first preset time interval, the first preset time interval enabling communication channels to be maintained with one or more other networks; and
modifying, until the first preset time interval is within the threshold of the channel release time, the first preset time interval based on periodic connections with the server when the current network is idle,
wherein a deviation of the preset time interval and the channel release time is within the threshold, and wherein information indicating the channel release time is determined based on the one or more connections.

7. The system of claim 6, wherein determining the preset time interval comprises:
connecting and communicating with the server at the first preset time interval when the network is idle, and obtaining a first connection time, the first preset time interval enabling the terminal to maintain channel connection in the network;
connecting and communicating with the server at a second preset time interval when the network is idle, and obtaining a second connection time;
determining whether the deviation between the second connection time and the first connection time meets a preset connection; and
when the deviation does not meet the preset condition, repeating reducing the second preset time interval by a first step length, connecting and communicating with the server at the second preset time interval when the network is idle, and obtaining the second connection time, until the deviation meets the preset condition, and taking the second time interval as the preset time interval; or
when the deviation meets the preset condition, repeating the step of increasing the second preset time interval by a second step length, connecting and communicating with the server at the second preset time interval when the network is idle, and obtaining the second connection time, until the deviation does not meet the preset condition, and taking the second time interval minus the second step length as the preset time interval.

8. The system of claim 7, wherein the operations further comprise:
connecting and communication with the server at the first preset time interval when the network is idle, recording the connection time of each time connecting and communicating with the server, and calculating the average time of preset numbers of connection time as the first connection time; and
connecting and communicating with the server at the second preset time interval when the network is idle, recording the connection time of each time connecting and communicating with the server, and calculating the average time of preset numbers of connection time as the second connection time.

9. The system of claim 7, wherein the operations further comprise:
obtaining a preset time interval of the current network from a service platform via the network; or
selecting the corresponding preset time interval from the local according to the network information.

10. The system of claim 7, wherein the operations further comprise uploading the preset time interval and the corresponding network information to the service platform.

11. A non-transitory computer-readable storage medium storing an executable program to execute a method for reducing data transmission delay, the method comprising:
detecting whether a terminal has data sending or receiving, and determining whether a current network is idle;
determining, when detecting that the terminal has no data sending or receiving, that the current network is idle, and
connecting with a server periodically according to a determined preset time interval, such that a communication channel with the server is maintained while the current network is idle, wherein the preset time interval is determined, based on one or more connections with the server, to be within a threshold of a channel release time associated with the current network,
wherein the step of determining the preset time interval includes:
obtaining information identifying a first preset time interval, the first preset time interval enabling communication channels to be maintained with one or more other networks; and
modifying, until the first preset time interval is within the threshold of the channel release time, the first preset time interval based on periodic connections with the server when the current network is idle,
wherein a deviation of the preset time interval and the channel release time is within the threshold, and wherein information indicating the channel release time is determined based on the one or more connections.

* * * * *